May 17, 1955   D. TAPPAN   2,708,452
FLUID PRESSURE OPERATED BALANCED VALVE
Filed Oct. 3, 1950
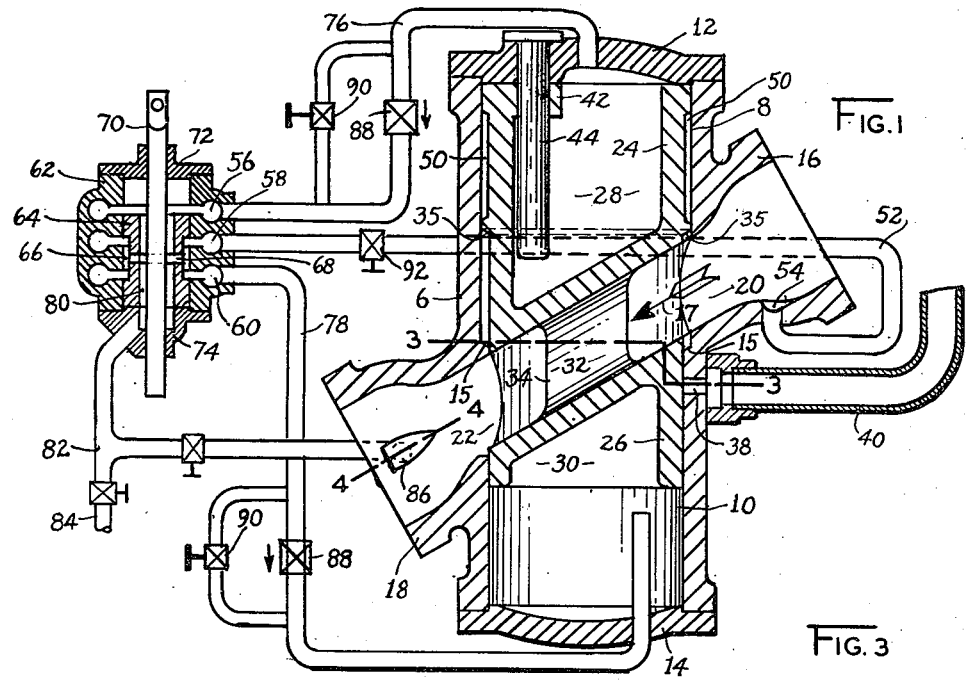
FIG. 1
FIG. 3
FIG. 4
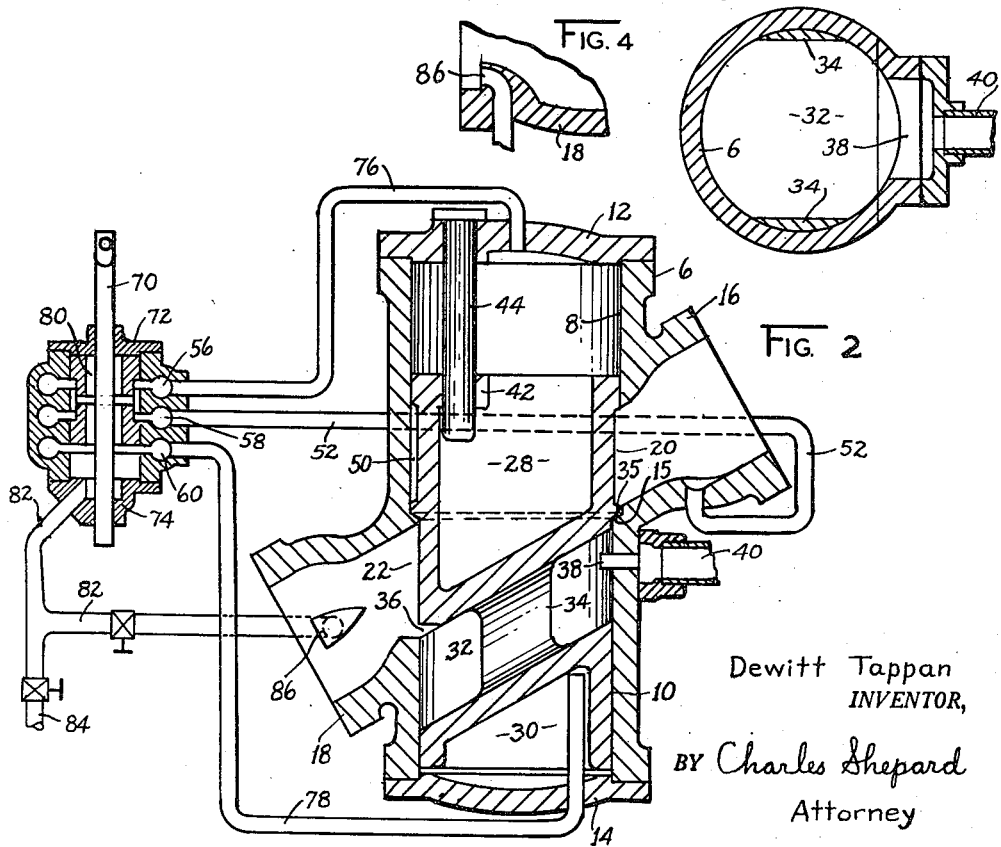
FIG. 2
Dewitt Tappan
INVENTOR,
BY Charles Shepard
Attorney United States Patent Office 2,708,452
Patented May 17, 1955

2,708,452

FLUID PRESSURE OPERATED BALANCED VALVE

Dewitt Tappan, Irondequoit, N. Y., assignor to
Ada I. Tappan, Rochester, N. Y.

Application October 3, 1950, Serial No. 188,199

7 Claims. (Cl. 137—625.25)

The present invention relates to valves and more particularly to valves for closing off and/or restoring the flow in fluid transmission lines, and the invention has for its general object to provide a simple, low cost, and highly efficient streamlined piston valve of this character.

Another object of the invention is to provide such a valve with counter-pressure means that will relieve it from laboring against the head in the line in its actuation between open and closed positions, thus balancing its movements and reducing the operational resistance to purely mechanical factors.

A further object is to provide simple and flexible control mechanism for controlling the operation of a valve of this character.

These and other desirable objects are accomplished by the construction disclosed as an illustrative embodiment of the invention in the following description and in the accompanying drawings forming a part hereof, in which:

Fig. 1 is a central section in an axial plane through a piston valve constructed in accordance with and illustrating one embodiment of the invention together with a semi-diagrammatic showing of a suggested operating and controlling means therefor, the piston being shown in open position;

Fig. 2 is a similar view with the piston in closed position;

Fig. 3 is a detail section taken on the line 3—3 of Fig. 1; and

Fig. 4 is a fragmentary detail section taken on the line 4—4 of Fig. 1.

The same reference numerals throughout the several views indicate the same parts.

Referring more particularly to the drawings, 6 indicates generally the cylindrical valve casing, the upper portion 8 of which is of slightly greater diameter than the lower portion 10, the casing being capped by cylinder heads 12 and 14. Intermediate its ends, the casing has a narrow internal ledge or shoulder 15 which constitutes a valve seat extending circumferentially around the inner wall and forming the dividing line between the larger diameter portion 8 and the smaller diameter portion 10. The general plane of this shoulder 15 is perpendicular to the common axis of the cylindrical portions 8 and 10, but the face of the shoulder is preferably slightly oblique or frusto-conical shape. Its total area is small in comparison to that of the flow conduit being controlled by the valve.

The fluid transmitting line controlled by this valve extends obliquely through the cylindrical casing 6 and through the valve seat 15, in the direction of the arrow 17 in Fig. 1. The fluid passageway is defined at its ends by an inlet collar or flange 16 leading to an inlet port 20 on one side of the casing 6 above the seat 15, and an outlet collar or flange 18 leading from an outlet port 22 on the opposite side of the casing 6 below the seat 15. These collars 16 and 18 constitute coupling collars for attachment in any conventional manner to inlet and outlet conduit sections of any suitable kind.

Reciprocatable in the cylinder 8—10 is a double piston with upper and lower portions 24 and 26, respectively, these portions having hollow heads 28 and 30, respectively. The upper portion 24 is of greater diameter than the lower portion 26 so as to fit snugly in the larger cylinder portion 8, except for a pressure-balancing annular chamber to be described below, while the lower piston portion 26 fits snugly but slidably in the lower cylindrical casing portion 10. Formed in an intermediate portion of the piston as a whole is a transverse passage 32 having the same acuteness of angularity as the alignment of the cylinder ports 20 and 22, and having substantially the same cross sectional area and capacity as these ports. Thus, when the valve is in open position and the piston 24—26 is at the upward limit of its movement as in Fig. 1, the passage registers with both ports and there is a straight, direct, substantially undeflected flow of fluid in the line through the valve from and to the conduits connected to the attaching collars 16 and 18 aforesaid.

In order to keep the diameter of the piston as small as possible and hence reduce the overall size and weight of the valve assembly as a whole for any given diameter of flow line, the present embodiment of the invention utilizes a passageway 32 having a lateral dimension of almost the full diameter of the piston, leaving at opposite sides of the passageway the two relatively small webs 34 which tie the two ends 24 and 26 of the piston to each other and which slightly flatten in a lateral direction the cross section of the flow passageway without breaking the smooth continuity of flow. From the science of solid geometry, it is apparent that when the circle of the seat or ledge 15 is viewed at a sharp oblique angle as in the direction of the arrow 17, it will appear to have a distinct oval or elliptical cross section rather than a circular cross section. The cross section of the passageway 32 through the valve piston takes full advantage of this maximum possible elliptical area of oblique passage through the circular valve seat 15, and is in the shape of such an ellipse, except for the very slight flattening of the ends of the ellipse by the small connecting webs 34. The ports 20 and 22 in the valve casing are of the same elliptical cross section. The external connection flanges or collars 16 and 18 merge the elliptical cross sections of the ports 20 and 22 gradually and smoothly into circular cross sections of equivalent area at the outer ends of these collars 16 and 18, so that they may be connected to conventional conduits or pipes of the usual circular cross sectional area. But the path of fluid flow through the valve, when in its open position, is smooth and uninterrupted, and "streamlined" in the true sense of the word, the cross sectional area of the flow passageway being substantially the same at all points along the passageway, and the cross sectional shape of the passageway merging gradually from circular to elliptical (slightly flattened at the ends of the ellipse) and then back to circular again.

When the piston 24—26 is dropped to its lowermost position as in Fig. 2, the valve is closed as portion 24 thereof blocks off intake port 20 and an external frusto-conical shoulder 35 on the piston seats onto and seals against the seat 15, so that the line flow is stopped. Outlet port 22 may be similarly simultaneously sealed, in which case the fluid in collar 18 and its connected conduit will, if subject to resistance or back pressure, remain static. But in situations where it is desired to drain the outlet with the closing of the intake, the outlet port 22 and that end of passage 32, may be relatively proportioned as in the present embodiment to leave permanent communication as at 36 (Fig. 2) one with the other. Such closed position of the valve also brings the opposite end of passage 32 in registration and communication with a relief port 38 in cylinder wall 10 and a connecting pipe 40 that supplies only atmospheric pressure to the interior and breaks any partial vacuum behind the outlet stream.

The piston 24—26 must, of course, be prevented from rotating to maintain these port and passage registrations, for which purpose, in the present instance, portion 24 is provided with an apertured lug 42 sliding on a fixed pin 44 projecting into cylinder head chamber 28 from head 12.

As to the balancing of the valve as earlier referred to against jamming under pressure caused by head and velocity in the transmitting line, for this purpose an annular cavity 50 is provided on the circumference of the upper piston portion 24. The lower wall of this cavity is constituted by the upper edge of the same ridge or projection on the lower edge of which the shoulder 35 is formed. When the piston starts its movement from the open position of Fig. 1 downwardly toward closed position, this encircling cavity is at once placed in communication with inlet port 20 and hence the pressure of the fluid transmission line applies all around the piston instead of against one side only. This counter-pressure is also maintained on the opening movement of the piston up to the final point where head 35 slides just beyond the confines of inlet port 20. Thus the valve is substantially perfectly balanced so far as fluid pressure in the main fluid line is concerned, and comparatively light forces are sufficient to move the valve piston endwise toward either open or closed position. There is no great fluid pressure side-thrust on the valve, tending to prevent movement of the valve, as there is on a conventional gate valve.

Means for operating the piston and hence controlling the valve may be varied according to engineering conditions in a given installation involving factors such as accessibility, pressure, velocity, and the nature of the fluid in the transmission line. I have illustrated a simple suggested means for remote fluid pressure control. It being assumed that pressure in the transmission line is adequate for the purpose, a pipe 52 leads from a port 54 in the collar 16 thereof to the center one, 58, of three annular ports 56, 58, and 60 in a cylindrically bored valve block 62. A piston 64, reciprocatable in the block, is provided with a circumferential chamber 66 capable of connecting either of the two combinations of adjacent ports, the piston being pinned at 68 to an operating stem 70 guided in the valve block caps 72 and 74. A pipe 76 leads from port 56 through cylinder head 12 to communicate with the hollow piston head 28. A pipe 78 leads from port 60 through cylinder head 14 to hollow piston head 30.

With the main cylinder valve open to the transmitting line as in Fig. 1, stem 70 of the control valve has been lowered and ports 58 and 60 are connected to each other (by annular chamber 66) to communicate the line pressure through pipe 52 to pipe 78 to piston head 30, thus raising the piston 24—26 and maintaining the line flow open. Meanwhile, any pre-existing pressure in the top of the cylinder has been exhausted through pipe 76 and port 56, now open above piston 64 to a central chamber 80 in the latter that is constantly open to an exhaust pipe 82 leading from the cylinder block 62 through cap 74. Reverse movement of valve stem 70 to the position of Fig. 2 will obviously reverse the pressures on the main piston heads in the same manner and hold the transmission line closed as will be easily traced.

Exhaust pipe 82 may discharge to the atmosphere as indicated at 84, if the line fluid is cheap and expendable, but if it is to be conserved pipe 82 leads back to the downstream or outlet side through connection with a port 86 in the main valve outlet collar 18.

In many cases, especially when controlling rather high fluid pressure, it is important to control accurately the closing speed of the valve, to avoid a "hammer" effect which would be produced if the valve were closed too quickly. And in some cases, as for example in fire hydrant usage, it may be desirable to have the valve open quickly, but to have it close slowly. Speed control in either or both directions may be accomplished by providing suitable valves in the conduits 76 and 78. For example, for fast opening and slow closing, the conduits 76 and 78 may both have one-way check valves 88 opening in the direction of the arrows, to provide for fast opening, and by-pass throttle valves 90 connected around the check valves and settable to restrict the reverse direction flow for slow closing of the main valve. For slow opening as well as slow closing, the throttle valves alone may be used directly in the conduits 76 and 78, or a single throttle valve may be used in the conduit 52, as indicated at 92. Indeed, this throttle valve 92 may be used in any event, and may be kept fully open when it is desired to have the main valve move quickly in at least one direction, and may be throttled down only when it is desired to have the main valve move slowly in both directions.

If the fluid pressure in the conduit controlled by the main valve is insufficient to operate the valve, the operating pressure conduit 52 may be connected to any suitable source of pressure, such as a water pressure line, or a pump.

The control valve 62, etc., may be placed at a considerable distance from the main valve, being connected thereto simply by the conduits 52, 76, 78, and 82. The control valve 62, etc., may itself be controlled from a remote distance, either by a long extension or mechanical linkage on the valve stem 70, or by an electric motor controlled by a switch at any degree of remoteness. For example, the main valve may be buried deep in the ground to control flow in a deeply buried fluid line; the control valve may be placed in a more accessible position near the surface of the ground; and the control valve stem may be moved by a small electric motor whose control switch (together with the control switches of other similar valves) is located at a central control panel, possibly several miles away. Thus the main valve, because of its great ease of operation from remote points, is well adapted to a great variety of uses, as for example in fire protective systems, and in oil refineries or other large industrial plants where it is desirable to control many different valves from a single central control point.

It is seen from the foregoing disclosure that the above mentioned objects of the invention are admirably fulfilled. It is to be understood that the foregoing disclosure is given by way of illustrative example only, rather than by way of limitation, and that without departing from the invention, the details may be varied within the scope of the appended claims.

What is claimed is:

1. A piston valve assembly embodying a cylinder having relatively transversely alined inlet and outlet ports, such alinement being obliquely angular to the axis of the cylinder, a piston reciprocatable in a cylinder and having sealing contact with the lateral walls thereof at both ends on both sides of the ports to block the inlet port when in closed position and provided with an angularly transverse passage registering with both ports when in open position, the interior of the cylinder being provided with an intermediate valve seat positioned on one side of the inlet port and the opposite side of the outlet port in the direction of movement of the piston to encircle the passage through the piston when the latter is in open position and the piston being provided with a circumferential intermediate annular head cooperating with the seat when the piston is in the aforesaid closed position, an annular circumferential counter-pressure cavity in the piston which cavity is open to the intake port when the piston is in closed position, but sealed by the piston from both ends of the cylinder, and means for operating the piston.

2. A piston valve assembly in accordance with claim 1, in which said cavity is so constructed as to be open to the intake port during substantialy all operating positions of the piston.

3. A piston valve assembly in accordance with claim 1, in which the portion of the cylinder between one end thereof and said valve seat is of greater diameter than the remainder thereof and a portion of the piston works in such cylinder portion and forms a seal for said annular circumferential counter-pressure cavity in the piston which cavity is open to the intake port when the piston is in closed position.

4. A piston valve assembly in accordance with claim 1, in which the piston provides a restricted communication between the outlet port in the cylinder when closing the intake port and the piston passage, and in which the cylinder is additionally provided with a relatively low pressure relief port, and the passage concomitantly registers with such relief port.

5. A piston valve assembly embodying a cylinder having relatively transversely aligned inlet and outlet ports such alinement being inclined obliquely relatively to the axis of the cylinder, and a piston reciprocatable in the cylinder to block the inlet port when in a closed position and provided with a transverse passage registering with both ports when in an open position, the piston being provided with a circumferential cavity open to the inlet port only and sealed from the cylinder at both ends beyond the piston by the remainder of the piston when the piston is in closed position to supply counter-pressure on the opposite side of the cylinder.

6. A valve assembly embodying a casing having relatively transversely aligned inlet and outlet ports, such alinement being inclined obliquely relatively to the axis of the cylinder, and a slidable element reciprocatable in the casing to block the inlet port when in a closed position and provided with a transverse passage registering with both ports when in an open position, the slidable element being provided with an encircling cavity sealed from both ends of the casing and open to the inlet port when the slidable element is in closed position to supply counter-pressure on the opposite side of the casing.

7. A valve assembly in accordance with claim 6, in which said encircling cavity is so constructed as to be open to said inlet port when said slidable element is in substantially all of its operating positions.

References Cited in the file of this patent

UNITED STATES PATENTS

| | | |
|---|---|---|
| 430,089 | Sewall | June 10, 1890 |
| 963,314 | Nolan | July 5, 1910 |
| 1,518,106 | Rafferty | Dec. 2, 1924 |
| 1,861,742 | Hand | June 7, 1932 |
| 2,335,067 | Langley | Nov. 23, 1943 |

FOREIGN PATENTS

| | | |
|---|---|---|
| 58,683 | Sweden | Apr. 21, 1925 |